United States Patent [19]
Dobson et al.

[11] Patent Number: 6,103,671
[45] Date of Patent: *Aug. 15, 2000

[54] GLYCOL SOLUTION DRILLING SYSTEM

[75] Inventors: James W Dobson, Houston; James P Cashion, Missouri City, both of Tex.

[73] Assignee: Texas United Chemical Company LLC., Houston, Tex.

[*] Notice: This patent is subject to a terminal disclaimer.

[21] Appl. No.: 08/975,118

[22] Filed: Nov. 20, 1997

[51] Int. Cl.$^7$ ............................... E21B 21/14; C09K 7/02
[52] U.S. Cl. ................ 507/261; 507/110; 507/136; 507/140; 507/213
[58] Field of Search ..................... 507/110, 136, 507/140, 213, 261

[56] References Cited

U.S. PATENT DOCUMENTS

| | | | |
|---|---|---|---|
| 4,216,113 | 8/1980 | Winyall | 523/210 |
| 4,425,241 | 1/1984 | Swanson | 507/110 |
| 4,561,985 | 12/1985 | Glass, Jr. | 252/8.5 |
| 4,963,273 | 10/1990 | Perricone et al. | 507/136 |
| 5,007,489 | 4/1991 | Enright et al. | 175/65 |
| 5,120,708 | 6/1992 | Melear et al. | 507/126 |
| 5,616,541 | 4/1997 | Dobson, Jr. et al. | 507/145 |
| 5,728,652 | 3/1998 | Dobson, Jr. et al. | 507/145 |
| 5,728,654 | 3/1998 | Dobson, Jr. et al. | 507/272 |

OTHER PUBLICATIONS

Ron Bland, Water–Based Glycol Systems Acceptable Substitute for Oil–Based Muds, Oil & Gas Journal, Jun. 1992, pp. 54–56, 58, 59.

J. D. Downs et al., Tame: A New Concept in Water–Based Drilling Fluids for Shales, SPE 26699, Sep. 1993.

A. J. Twynam et al., Glycol–Enhanced Water–Based Muds: Case History to Demonstrate Improved Drilling Efficiency in Tectonically Stressed Shales, SPE 27451, Feb. 1994.

P. I. Reid, Mechanism of Shale Inhibition by Polyols in Water–Based Drilling Fluids, SPE 28960, Feb. 1995.

R. G. Bland et al., Low Salinity Polyglycol Water–Based Drilling Fluids as Alternatives to Oil–Based Muds, SPE/IADC 29378, 1995.

Ron Bland et al., Low Salinity Polyglycol Water–Based Drilling Fluids as Alternatives to Oil–Based Mud, IADC/SPE 36400, 1996.

Simon Seaton, Glycols Applied in a Broad Range of Drilling Fluids, Petroleum Eng. Int., Mar. 1997, pp. 57–59, 61.

Eric Van Oort, Improving HTHP Stability of Water Based Drilling Fluids, SPE/IADC 37605, Mar. 1997.

Unknown, Drill–In Fluids Improve High–Angle Well Production, Petroleum Engineer International, Supplement, Mar. 1995, pp. 5–11.

Jay Dobson et al., Soluble Bridging Particle System Generates Successful Completions in Unconsolidated Sand Reservoirs, 5th Intl. Conf. on Horizontal Well Technology, Jul., 1993.

Eric Van Oort, Physico–Chemical Stabilization of Shales, SPE 37263, Feb. 1997.

*Primary Examiner*—Jill Warden
*Assistant Examiner*—LaToya Cross
*Attorney, Agent, or Firm*—Roy F. House

[57] ABSTRACT

The invention provides water base well drilling and servicing fluids containing a biopolymer viscosifier and a water soluble polyalkylene glycol shale stabilizing additive therein having enhanced thermal stability, as indicated by the low shear rate viscosity at 0.06 $\sec^{-1}$, the enhanced thermal stability being provided by an amorphous silica viscosifier therein.

A method of enhancing the thermal stability of aqueous base well drilling and servicing fluids containing a biopolymer viscosifier and a water soluble polyalkylene glycol shale stabilizing additive therein is disclosed which comprises adding to the fluid an amorphous silica viscosifier.

10 Claims, No Drawings

GLYCOL SOLUTION DRILLING SYSTEM

BACKGROUND OF THE INVENTION

1. Field of the Invention

This invention relates to well working fluids useful in drilling, completing, or workover of oil and gas wells, and specifically, to water-base fluids containing one or more water soluble polyalkylene glycols, and one or more polysaccharide viscosifiers therein.

2. Prior Art

During the drilling of an oil and gas well, including drilling into a hydrocarbon-bearing formation and during conducting completion and workover operations in a well, it is essential to utilize a fluid in the well bore (i.e., borehole) to minimize the effect of the fluid on the formations contacted by the fluid. See for example the paper by Eric van Oort entitled "Physico-Chemical Stabilization of Shales", Society of Petroleum Engineers (SPE) paper no. 37263.

Water based fluids containing various glycols and/or glycol ethers have been proposed, and are being used, which have much better shale stabilizing characteristics than prior known water base fluids. See for example the following references: Perricone et al., U.S. Pat. No. 4,963,273; Enright et al., U.S. Pat. No. 5,007,489; Melear et al., U.S. Pat. No. 5,120,708; "Water-Based Glycol Systems Acceptable Substitute for Oil-Based Muds", R. Bland, Oil & Gas Journal, Jun. 29, 1992, pp. 54–56, 58, 59; "TAME: A New Concept in Water-Based Drilling Fluids for Shales", J. D. Downs et al., SPE 26699; "Glycol-Enhanced Water-Based Muds: Case History To Demonstrate Improved Drilling Efficiency in Tectonically Stressed Shales," A. J. Twynam et al., IADC/SPE 27451; "Mechanism of Shale Inhibition by Polyols in Water Based Drilling Fluid", P. I. Reid et al., SPE 28960; "Low Salinity Polyglycol Water-Based Drilling Fluids as Alternatives to Oil-Based Muds", R. G. Bland et al., SPE/IADC 29378; "Low Salinity Polyglycol Water-Based Drilling Fluids as Alternatives to Oil-Based Muds", R. Bland et al., IADC/SPE 26400; "Glycols Applied In A Broad Range of Drilling Fluids," S. Seaton, Hart's Petroleum Engineer International, March, 1997, pp. 57–59, 61; "Improving HTHP Stability of Water Based Drilling Fluids", Eric van Oort et al., SPE/IADC 37605.

It is well known that certain biopolymer-containing fluids are shear thinning, exhibiting a high low shear rate viscosity and a low high shear rate viscosity. A near zero shear rate (0.06 to 0.11 $sec^{-1}$) viscosity provides a numerical value related to the ability of a fluid to suspend particles or cuttings under static conditions. Conversely, viscosity measured at shear rates above 20 $sec^{-1}$ relates to the hole cleaning capacity of a fluid under annular flow conditions. Such fluids have been eminently successful for use in high angle and horizontal drilling. See for example: (1) "Drill-In Fluids Improve High-Angle Well Production", Supplement to Petroleum Engineer International, March, 1995, p. 5–11; and (2) "Soluble Bridging Particle Drilling System Generates Successful Completions in Unconsolidated Sand Reservoirs", J. Dobson and D. Kayga, presented at the 5$^{th}$ International Conference on Horizontal Well Technology, Amsterdam, The Netherlands, Jul. 14–16, 1993.

It is disclosed in Dobson, Jr. et al. U.S. Pat. No. 5,616,541 to utilize an amorphous silica as a viscosifier in calcium- and zinc-containing high density brine fluids. It is disclosed in co-pending United States Patent application of James W. Dobson, Jr. et al. Ser. No. 08/512,675 filed Aug. 25, 1995, to provide calcium- and zinc-containing brine fluids containing one or more polysaccharide polymer viscosifiers and an amorphous silica viscosifier therein.

Dobson Jr. U.S. Pat. No. 5,514,644 discusses the thermal instability of aqueous polysaccharide-containing fluids.

SUMMARY OF THE INVENTION

We have determined that the viscosity of aqueous base fluids having one or more polyglycols dissolved therein containing a biopolymer viscosifier decrease in viscosity, particularly low shear rate viscosity, upon aging the fluids at elevated temperatures.

Thus it is an object of this invention to provide a method of enhancing the thermal stability of aqueous base well drilling and servicing fluids containing a biopolymer viscosifier and a water soluble polyalkylene glycol shale inhibitor.

It is another object of this invention to provide aqueous base well drilling and servicing fluids which contain a biopolymer viscosifier and a water soluble polyalkylene glycol shale inhibitor and which exhibit enhanced thermal stability as indicated by the low shear rate viscosity of the fluid.

It is still another object of this invention to provide well drilling and servicing fluids containing a biopolymer viscosifier and a water soluble polyalkylene glycol shale inhibitor which exhibit enhanced thermal stability as measured by the low shear rate viscosity of the fluid and which exhibit a shale stability index of at least about 80, preferably at least about 90.

These and other objects of the invention which will be apparent to one skilled in the art upon reading this specification are obtained by incorporating into the fluids a fumed silica viscosifier in an amount sufficient to increase the thermal stability of the fluids.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The method and fluids of this invention comprise adding an amorphous silica viscosifier to an aqueous base fluid comprising a biopolymer viscosifier in a water soluble polyalkylene glycol solution. The prior art fluids to which the amorphous silica is added to enhance the thermal stability thereof comprises an aqueous solution of a water soluble polyalkylene glycol containing a biopolymer viscosifier solubilized and/or dispersed therein.

The biopolymer viscosifier useful in the practice of this invention is preferably a xanthomonas gum (xanthan gum). Xanthomonas gum is available commercially. It is a widely used viscosifier and suspending agent in a variety of fluids, Xanthomonas gum can be made by the fermentation of carbohydrate with bacteria of the genus Xanthomonas. Representative of these bacteria are *Xanthomonas campestris, Xanthomonas phaseoli, Xanthomonas mulvacearn, Xanthomonas carotoe, Xanthomonas traslucens, Xanthomonas hederae*, and *Xanthomonas papavericoli*. The gum produced by the bacteria *Xanthomonas campestris* is preferred for the purpose of this invention. The fermentation usually involves inoculating a fermentable broth containing a carbohydrate, various minerals and a nitrogen-yielding compound. A number of modifications in the fermentation procedure and subsequent processing are commercially used. Due to the variety of fermentation techniques and difference in processing operation subsequent to fermentation, different production lots of xanthomonas gum will have somewhat different solubility and viscosity properties. Xanthomonas gums useful in the practice of the present invention are relatively hydratable xanthomonas gums.

The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and any of the xanthan gums and their derivatives can be used in this invention. Xanthan gum is a high molecular weight linear polysaccharide that is readily soluble in water to form a viscous fluid.

Other biopolymers prepared by the action of other bacteria, or fungi, on appropriate fermentation mediums may be used in the fluids of the present invention provided that they impart the desired thermally stable rheological characteristics thereto. This can be readily determined by one skilled in the art in accordance with the teachings of this specification.

The term "biopolymer" is intended to mean an excellular polysaccharide of high molecular weight, in excess of 500,000, produced by fermentation of a carbohydrate source by the action of bacteria or fungi. Representative microorganisms are the genus Xanthomonas, Pseudomonas, Agrobacterium, Arthrobacter, Rhizobium, Alcaligenes, Beijerincka, and Sclerotium. A succinoglucan type polysaccharide produced by microorganisms such as NCIB 11592 and NCIB 11883 is commercially available. A schleroglucan gum is commercially available from SanofiBio-Industries as ACTIGUM™ CS 6 DF scleroglucan.

The water soluble polyalkylene glycol useful in the practice of this invention is generally selected from the group consisting of polyethylene glycols, polypropylene glycols, polytetramethylene glycols, ethylene oxide-propylene oxide copolymers, alcohol initiated ethylene oxide polymers, alcohol initiated propylene oxide polymers, amine initiated ethylene oxide polymers, and/or mixtures thereof, wherein the polyalkylene glycol has a molecular weight from 100 to about 10,000. Preferably the polyalkylene glycol is a polyethylene glycol having a molecular weight from about 1000 to about 10,000, most preferably from about 4000 to about 10,000. Mixtures of a polyethylene glycol having a molecular weight from about 1000 to about 10,000 with lower molecular weight water soluble polyalkylene glycols, such as tripropylene glycol, have particular utility in the fluids of this invention.

The amorphous silica viscosifier, as known and accepted in the art is derived either by a liquid phase or a vapor process. Silicas obtained by the vapor process are called fumed or pyrogenic silicas. Products obtained by the liquid process are categorized as silica gels and precipitated silicas.

Silica, to be an effective thickening agent must be of a fine size. By fine size is meant that the silica must be in a particle size range of less than 100 millimicrons. These silica materials may either initially be of this small particle size, or be capable of being easily deaggregated or disintegrated to this small particle size when mixed into the liquid to be thickened. Very useful silica thickeners have generally been produced by pyrogenic techniques. These silicas are the thermal decomposition silicon product of silicon tetrachloride. A prime characteristic of these pyrogenic silica materials is that they are loosely aggregated to about a 0.5 to 5 micron size, but which when mixed into a liquid readily deaggregate to less than 100 millimicron sized particles.

Silica thickening agents have also been produced by aerogel processes. Generally these are not as good in thickening liquids as pyrogenic silicas.

U.S. Pat. No. 4,216,113 discloses a modified hydrogel process which produces silica thickening agents of a particle size range of 0.5 to 5 micrometers. It is readily deaggregated under conventional mixing to particle sizes of less than 100 millimicrons. A commercially available precipitated silica viscosifier is HI-SIL T-600, a product of PPG Industries, Inc. It has an average ultimate particle size of 21 millimicrons and an average agglomeration size of 1.6 microns (micrometers).

The pyrogenic, fumed silicas are preferred.

The fluids of this invention optionally, but preferably, contain one or more fluid loss control additives, a particulate bridging agent, and an alkaline buffer compound. The preferred fluid loss control additives are polymers.

Polymeric fluid loss control additives used in well drilling and servicing fluids are so-called water soluble polymers including pregelatinized starch, starch derivatives, cellulose derivatives, lignocellulose derivatives, and synthetic polymers. Representative starch derivatives include: hydroxyalkyl starches such as hydroxyethyl starch, hydroxypropyl starch, hydroxypropyl carboxymethyl starch, the slightly crosslinked derivatives thereof, and the like; carboxymethyl starch and the slightly crosslinked derivatives thereof; cationic starches such as the tertiary aminoalkyl ether derivatives of starch, the slightly crosslinked derivatives thereof, and the like. Representative cellulose derivatives include low molecular weight carboxymethyl cellulose, and the like. Representative lignocellulose derivatives include the alkali metal and alkaline earth metal salts of lignosulfonic acid and graft copolymers thereof. Representative synthetic polymers include vinyl sulfonate copolymers, and polymers containing other sulfonate monomers.

The preferred polymeric fluid loss control additives used in the invention are the starch ether derivatives such as hydroxyethyl starch, hydroxypropyl starch, dihydroxypropyl starch, carboxymethyl starch, hydroxyalkyl carboxymethyl starch, and cationic starches, and the slightly crosslinked derivatives of these starch ethers.

Preferably the polymeric fluid loss control additive is a starch ether derivative which has been slightly crosslinked, such as with epichlorohydrin, phosphorous oxychloride, soluble trimetaphosphates, linear dicarboxylic acid anhydrides, N,N$^1$-methylenebisacrylamide, and other reagents containing two or more functional groups which are able to react with at least two hydroxyl groups. The preferred crosslinking reagent is epichlorohydrin. Generally the treatment level is from about 0.005% to 0.1% of the starch to give a low degree of crosslinking of about one crosslink per 200 to 1000 anhydroglucose units. The crosslinking may be undertaken before or after the starch is derivatized. Additionally, the starch may be modified by acid or enzyme hydrolysis or oxidation, to provide a lower molecular weight, partially depolyermized, starch polymer for derivatization. Alternatively, the starch ether derivative may be modified by acid hydrolysis or oxidation to provide a lower molecular weight starch ether derivative. The book entitled "Modified Starches: Properties and Uses," by O. B. Wurzburg, 1986 (CRC Press, Inc., Boca Raton, Fla., U.S.A.) is an excellent source for information in the preparation of starch derivatives.

As indicated, the preferred fluids of this invention contain a particulate bridging agent. The particle size distribution of the bridging agent must be sufficient to bridge across and seal the pores in the subterranean formations contacted by the fluids. The range of sizes should include some very fine particles and some particles large enough to bridge the largest pores of substantially all permeable earth formations other than those which are characterized by lost circulation problems. Such "very fine" particles preferably have sizes of from about 0.01 to about 2 microns (micrometers) and such "bridging size" particles preferably have sizes from about 2 microns to less than about 800 microns. The very fine particles will help to decrease the permeability of the filter cake as soon as it starts to form. This results in extremely thin filter cakes deposited by the fluids of this invention.

The amount of particles and the size distribution and range of the particles should be such that the "mud spurt" (the invasion of the formation by whole fluid while a filter cake is being formed) is relatively low. The mud spurt is low when the fluid contains an adequate distribution of particle sizes in the bridging size range and an adequate total proportion, in the order of at least one percent by weight, of solid particles. The bridging agent must not be soluble in the fluid.

Representative acid soluble bridging agents include calcium carbonate, dolomite (calcium/magnesium carbonate), iron carbonate, and other carbonates, as well as water insoluble metal oxides or hydroxides.

Optionally, but preferably, the fluids of this invention contain an alkaline buffer. The alkaline buffer may be any alkaline particulate material having a low water solubility which will react with acids to decrease the acidity of the fluids. Representative alkaline buffers are magnesium oxide, calcium oxide, zinc oxide, calcined dolomite, magnesium hydroxide, calcium hydroxide, zinc hydroxide, hydrated dolomitic lime (calcium/magnesium hydroxide), and the like, preferably zinc oxide or magnesium oxide. Most preferably the buffer is magnesium oxide. The fluids should exhibit a pH in the range from about 7.0 to about 11.0.

The fluids of this invention may contain any of the known water insoluble weighting agents known in the art to impart the desired density thereto.

The fluids of this invention may contain low concentrations of water soluble salts which enhance the shale stabilizing characteristics of the fluids. Preferred are potassium salts, particularly dibasic potassium phosphate ($K_2HPO_4$), potassium citrate, potassium acetate, potassium carbonate, potassium bromide, potassium nitrate, potassium oxalate, potassium formate and potassium chloride. Other alkali metal salts such as sodium and cesium salts similar to the potassium salts (i.e., with the same anion) may also be used.

The concentration of soluble salt which can be incorporated into the fluids of this invention is dependent upon the particular polyalkylene glycol, and its molecular weight, present in the fluid, and on the concentration of the polyalkylene glycol. Generally as the molecular weight of the polyalkylene glycol and/or the concentration of the polyalkylene glycol increases, the concentration of the water soluble salt which can be present in the fluid decreases. Too high a concentration of the water soluble salt produces fluids which are unstable at elevated temperatures. The concentration of salt which the fluid can contain can be readily determined by one skilled in the art using well-known industry procedures.

The Shale Stability Index of the fluids of this invention can be further increased by the addition of various low molecular weight polyols to the fluids, such as, for example, low molecular weight polyalkylene glycols (as disclosed hereinbefore), alkylene glycols, glycerin, polyglycerin, and the like.

The fluids of this invention have excellent environmental characteristics, exhibiting a $LC_{50}$ greater than 500,000 ppm when evaluated by the Drilling Fluid Toxicity 96-hour Range-Finding Test with Mysidopsis bahia shrimp.

The method of the invention can be practiced by adding an amorphous silica, preferably a fumed silica, to an aqueous base well drilling and servicing fluid containing a biopolymer viscosifier and a water soluble polyalkylene glycol of the types disclosed herein. Alternatively, the biopolymer, water soluble polyalkylene glycol, and the fumed silica can be added in any order to an aqueous fluid to prepare a fluid which exhibits enhanced thermal stability as compared to a fluid which contains no amorphous silica. Preferably the biopolymer is dispersed and hydrated in the base aqueous fluid before adding the polyalkylene glycol thereto.

The invention will be understood in light of the following specific examples, which are merely illustrative and should not be construed as limiting the invention in any respect, as will be evident to those skilled in the art.

In these examples and this specification, the following abbreviations may be used: API=American Petroleum Institute; bbl=42 gallon barrel; lbm/bbl=pounds per barrel; gal= gallon; m³=cubic meters; °F.=degrees Fahrenheit; %=percent; kg/m³=kilogram per cubic meter; PV=API plastic viscosity in centipoise; YP=API yield point in pounds per 100 square feet; 10"/10' Gels=10 second/10 minute gel strengths in pounds per 100 square feet; LSRV=Brookfield low shear rate viscosity at 0.3 revolutions per minute, 0.06 sec$^{-1}$ in centipoise; SSI=Shale Stability Index; HTHP=high temperature high pressure; PEG=Polyethylene Glycol; M.W.=molecular weight; wt.=weight; vol.=volume.

The plastic viscosity, yield point, and gel strengths were obtained by the procedures set forth in API's Recommended Practice 13B-1. The LSRV was obtained for the fluids using a Brookfield Model LVTDV-I viscometer having a number 2 spindle at 0.3 revolutions per minute. The LSRV is indicative of the suspension properties of the fluid, the larger the LSRV, the better is the suspension of solids in the fluid. The Shale Stability Index is obtained using the following procedure:

Shale Core Preparation

1. Add 10.0 grams of salt to 300 ml of tap water in a Waring blender and stir until dissolved.
2. Add 100.0 grams of Pierre shale to the NaCl slurry.
3. Shear the slurry on the Waring blender for 4 minutes.
4. Set up a double-ended cement cell with filter paper and a coarse screen. Pour the slurry into the cell and place a piston onto the slurry. Place the cell in an HTHP heating jacket at room temperature, and apply 1000 psi to the slurry to filter the liquid portion. The cell needs to remain on for a minimum of 48 hours.
5. Remove the reconstituted shale core from the cell. Break the core down into 19.0 and 19.5 gram samples.
6. Fit a small piece of filter paper to both sides of the shale in a Carver press die assembly and then press at 20,000 psi. Remove the core from the assembly and place in 1⅛ inch pvc plugs (core holder).
7. Press the core into the pvc plugs on the Carver press at 1000 psi.
8. Shave the excess shale off the tope of the cores.
9. Place the shale cores into an oven at 150° F. for 4 hours.
10. Place the cores in a desiccator containing saturated sodium formate with a relative humidity between 60% and 63%. The samples are left in the desiccator for a minimum of 48 hours.

SSI Values

1. The shale cores are removed from the dessicator and placed on the base of a penetrometer. The cone and the depth gauge of the penetrometer are lowered 38 mm (380 rds) to near the top of the core sample. A UNIVERSAL PRECISION Penetrometer with a 25 mm width, 2.77 mm length, 45 g cone is used.
2. The cone is set with the adjustment screw assembly to become flush with the surface of the core. The shale is now zeroed with the cone. The cone and the depth gauge are raised to the top position.
3. The lever (clutch) is then released, dropping the cone. The depth gauge is lowered until the gauge stops and the dial reading is recorded. This procedure is repeated twice more, and the average of the three readings are calculated. This is the initial penetration depth.
4. A fluid sample is prepared.
5. The core sample is attached to a jar lid with silicone and aged a minimum of 15 minutes for the silicone to cure.
6. The fluid sample is added to a jar and the jar lid with the core is screwed on tightly. The jar is place in a roller oven at 150° F. for 16 hours.
7. The sample is removed from the roller oven and kept inverted so the shale remains submersed in the fluids until the samples have cooled.
8. The jar lid with the attached core is placed on the base of the penetrometer. A paper towel is used to blot off any excess fluid on top of the core sample.
9. Steps 1–3 are repeated to determine the final penetration depth.
10. The formula for SSI values is as follows:

$$\frac{(210 - \text{final penetration depth})}{(210 - \text{initial penetration depth})}(100)$$

NOTE: 210 is the penetration depth obtained by treating the core sample in deionized water.

In the Examples and Tables, the starch derivatives are as follows: Modified Starch I is a crosslinked ether derivative of a partially depolymerized starch as set forth in Dobson, Jr. et al. U.S. Pat. No. 5,641,728; Modified Starch II is a pregelatinized crosslinked amylopectin starch; and Modified Starch III is an epichlorohydrin crosslinked hydroxypropyl starch as set forth in Dobson, Jr. et al. U.S. Pat. No. 4,822,500.

EXAMPLE 1

Fluids were prepared in tap water containing 1.25 lb/bbl (3.57 kg/m³) xanthan gum, 1.0 lbm/bbl (2.85 kg/m³) fumed silica, 3.75 lbm/bbl (10.71 kg/m³) Modified Starch I, 20.3 lbm/bbl (57.96 kg/m³) sized calcium carbonate, and the concentrations of polyethylene glycol of 8000 molecular weight (PEG 8000) set forth in Table A. These fluids were evaluated for pH and rheological characteristics initially and after hot rolling for 16 hours at 150° F. The Shale Stability Index (SSI) of the fluids was evaluated initially. The data obtained are set forth in Table A. Fluid 1, which contains no PEG 8000, is not an example of the invention.

COMPARATIVE EXAMPLE 1

Fluids were prepared as in Example 1 except that no fumed silica was incorporated into the fluids. The data obtained are set forth in Comparative Table A.

Comparison of the data in Table A and Comparative Table A indicates the enhanced thermal stability imparted to the fluids by the incorporation of the fumed silica therein, as evidenced by the rheological characteristics of the fluids, particularly the LSRV.

EXAMPLE 2

Fluids were prepared containing 0.98 bbl (0.1558 m³) of a 10.7 volume % PEG 8000 solution, 1.25 lbm/bbl (3.57 kg/m³) xanthan gum, 1.0 lbm/bbl (2.85 kg/m³) fumed silica, 3.75 lbm/bbl (10.71 kg/m³) Modified Starch I, 20.3 lbm/bbl (57.86 kg/m³) sized calcium carbonate, and 1.0 lbm/bbl (2.85 kg/m³) of the water soluble salts set forth in Table B. The fluids were evaluated as in Example 1 and the data obtained are set forth in Table B.

The data indicate that the dibasic potassium phosphate, potassium citrate, potassium acetate, potassium carbonate, and potassium bromide increased the shale stability index of the fluids. The potassium chloride, although increasing the shale stability index, completely destroyed the fluid upon hot rolling at 150° F.

EXAMPLE 3

Fluids were prepared containing 0.98 bbl (0.1558 m$^3$) of a 9.24 volume % PEG 8000 solution, 1.25 lbm/bbl (3.57 kg/m$^3$) xanthan gum, 1.0 lbm/bbl (2.85 kg/m$^3$) fumed silica, 6.0 lbm/bbl (17.13 kg/m$^3$) Modified Starch indicated in Table C, 1.0 lbm/bbl (2.85 kg/m$^3$) magnesium oxide, 1.0 lbm/bbl (2.85 kg/m$^3$) K$_2$HPO$_4$, 20 lbm/bbl (57.1 kg/m$^3$) sized calcium carbonate, and 0.0072 gal/bbl (0.00017 m$^3$/m$^3$) silicone defoamer. The fluids were evaluated as in Example 1. The data obtained are set forth in Table C.

The data indicate the excellent thermal stability and shale stabilizing characteristics of the fluids of this invention.

EXAMPLE 4

Fluids were prepared containing 0.96 bbl (0.1526 m$^3$) of the polyethylene glycol solutions set forth in Table D, 1.25 lbm/bbl (3.57 kg/m$^3$) xanthan gum, 1.0 lbm/bbl (2.85 kg/m$^3$) fumed silica, 3 lbm/bbl (8.57 kg/m$^3$) Modified Starch I, 1.0 lbm/bbl (2.85 kg/m$^3$) K$_2$HPO$_4$, 20 lbm/bbl (57.1 kg/m$^3$) sized calcium carbonate, 0.06 gal/bbl (0.00143 m$^3$/m$^3$) silicone defoamer, and the concentrations of dipropylene glycol, magnesium oxide, and PEG 8000 set forth in Table D. The shale stability index exhibited by the fluids was evaluated and the data are set forth in Table D.

EXAMPLE 5

Fluids were prepared containing the concentrations of 9.24 volume % PEG 8000 and glycerin set forth in Table E, 1.0 lbm/bbl (2.855 kg/m$^3$) xanthan gum, 4.0 lbm/bbl (11.42 kg/m3) Pregelatinized Potato Starch, 1.0 lbm/bbl (2.855 kg/m$^3$) magnesium oxide, 1.0 lbm/bbl (2.855 kg/m$^3$) K$_2$HPO$_4$, 18.0 lbm/bbl (51.4 kg/m$^3$) sized calcium carbonate, and 1.0 lbm/bbl (2.855 kg/m$^3$) fumed silica. The fluids were evaluated as in Example 1. The data obtained are set forth in Table E.

The data indicate the excellent thermal stability and shale stabilizing characteristics of the fluids of this invention.

EXAMPLE 6

Fluids were prepared containing the concentrations of 9.24 vol. % PEG 8000 solution and a mixture of dipropylene glycol and tripropylene glycol set forth in Table F, 1.25 lbm/bbl (3.57 kg/m$^3$) xanthan gum, 3.75 lbm/bbl (10.7 kg/m$^3$) Modified Starch No. 1, 1.0 lbm/bbl (2.855 kg/m$^3$) potassium carbonate, 20.3 lbm/bbl (58.0 kg/m$^3$) sized calcium carbonate, and 1.0 lbm/bbl (2.855 kg/m$^3$) fumed silica. The fluids were evaluated as in Example 1. The data are set forth in Table F.

The data again indicate the excellent thermal stability and shale stabilizing characteristics of the fluids of this invention.

EXAMPLE 7

0.98 bbl (0.1558 m$^3$) of 9.24 Volume % of PEG 8000, 1.25 lbm/bbl (3.57 kg/m$^3$) xanthan gum, 0.06 gal/bbl (0.00143 m$^3$/m$^3$) silicone defoamer, 2.0 lbm/bbl (5.71 kg/m$^3$) MgO, 1.0 lbm/bbl (2.855 kg/m$^3$) K$_2$HPO$_4$, 20 lbm/bbl (57 kg/m$^3$) sized calcium carbonate, and the concentrations of fumed silica, precipitated silica, Modified Starch No. 1 and Modified Starch No. 2 set forth in Table G. The data obtained are set forth in Table G.

TABLE A 3.75 lbm/bbl Modified Starch I, 1.25 lbm/bbl Xanthan Gum, 20.3 lbm/bbl Sized CaCO$_3$, 1.0 lbm/bbl Fumed Silica, Indicated Quantity PEG 8000

| Fluid | 1 | 2 | 3 | 4 | 5 | 6 | 7 |
|---|---|---|---|---|---|---|---|
| PEG 8000, lbm/bbl | 0 | 25 | 50 | 75 | 100 | 125 | 150 |
| PEG 8000, Vol. % | 0 | 2.8 | 5.6 | 8.4 | 11.2 | 14.0 | 16.8 |
| INITIAL PROPERTIES | | | | | | | |
| pH | 8.3 | 8.0 | 8.4 | 7.9 | 7.6 | 7.7 | 7.6 |
| SSI | — | 45 | 82.6 | 87.2 | 89.3 | 91.3 | 92.0 |
| LSRV | 31500 | 30000 | 28200 | 31100 | 21800 | 33600 | 30000 |
| API Rheology | | | | | | | |
| PV | 9 | 9 | 29 | 40 | 66 | 86 | 43 |
| YP | 17 | 16 | 24 | 28 | 30 | 54 | 26 |
| 10'/10" Gels | 12/22 | 8/9 | 11/14 | 11/16 | 12/16 | 13/17 | 10/11 |
| PROPERTIES AFTER 16 HOURS HOT ROLLING AT 150° F. | | | | | | | |
| pH | 7.5 | 8.0 | 8.0 | 7.9 | 7.7 | 7.7 | * |
| LSRV | 15200 | 16000 | 31400 | 30700 | 26200 | 29300 | * |
| API Rheology | | | | | | | |
| PV | 6 | 9 | 23 | 38 | 59 | 92 | * |
| YP | 15 | 18 | 23 | 23 | 30 | 33 | * |
| 10'/10" Gels | 7/8 | 8/11 | 11/15 | 11/15 | 12/16 | 12/17 | * |

TABLE A-continued 3.75 lbm/bbl Modified Starch I, 1.25 lbm/bbl Xanthan Gum, 20.3 lbm/bbl Sized CaCO$_3$, 1.0 lbm/bbl Fumed Silica, Indicated Quantity PEG 8000

| Fluid | 1 | 2 | 3 | 4 | 5 | 6 | 7 |
|---|---|---|---|---|---|---|---|
| CHANGE UPON HOT ROLLING AT 150° F. | | | | | | | |
| ΔLSRV, % | −52 | −20 | +11 | −1 | +20 | −13 | — |
| ΔPV, % | −33 | 0 | −21 | −5 | −8 | +7 | — |
| ΔYP, % | −12 | +12 | −4 | −18 | 0 | −39 | — |

*Fluid unstable

COMPARATIVE TABLE A 3.75 lbm/bbl Modified Starch I, 1.25 lbm/bbl Xanthan Gum, 20.3 lbm/bbl Sized CaCO$_3$, Indicated Quantity PEG 8000

| Fluid | 1 | 2 | 3 | 4 | 5 | 6 | 7 |
|---|---|---|---|---|---|---|---|
| PEG 8000, lbm/bbl | 0 | 25 | 50 | 75 | 100 | 125 | 150 |
| PEG 8000, Vol. % | 0 | 2.8 | 5.6 | 8.4 | 11.2 | 14.0 | 16.8 |
| INITIAL PROPERTIES | | | | | | | |
| pH | 9.1 | 8.25 | 7.62 | 7.33 | 7.30 | 7.14 | 7.8 |
| LSRV | 21,100 | 24,800 | 33,900 | 28,800 | 30,500 | 27,900 | 27,800 |
| API Rheology | | | | | | | |
| PV | 6 | 10 | 18 | 32 | 47 | 61 | 71 |
| YP | 13 | 18 | 38 | 22 | 29 | 28 | 27 |
| 10"/10' Gels | 6/7 | 10/11 | 14/15 | 11/13 | 13/15 | 13/14 | 8/9 |
| PROPERTIES AFTER 16 HOURS HOT ROLLING AT 150° F. | | | | | | | |
| pH | 7.67 | 7.53 | 6.81 | 6.76 | 6.81 | 7.43 | * |
| LSRV | 7800 | 12,000 | 13,200 | 21,700 | 19,400 | 7600 | |
| API Rheology | | | | | | | |
| PV | 5 | 8 | 11 | 19 | 31 | 42 | |
| YP | 12 | 14 | 18 | 17 | 20 | 18 | |
| 10"/10' Gels | 5/6 | 6/6 | 7/7 | 7/7 | 7/8 | 6/6 | |
| CHANGE UPON HOT ROLLING AT 150° F. | | | | | | | |
| ΔLSRV, % | −63 | −52 | −61 | −25 | +36 | −73 | — |
| ΔPV, % | −17 | −20 | −40 | −41 | −34 | −31 | — |
| ΔYP, % | −8 | −22 | −53 | −53 | −31 | −36 | — |

*Fluid unstable

TABLE B 0.98 bbl of 10.07 Vol. % PEG 8000, 3.75 lbm/bbl Modified Starch I, 1.25 lbm/bbl Xanthan Gum, 20.3 lbm/bbl Sized CaCO$_3$, 1.0 lbm/bbl Fumed Silica, 1.0 lbm/bbl Inorganic Salt

| Fluid | 1 | 2 | 3 | 4 | 5 | 6 | 7 |
|---|---|---|---|---|---|---|---|
| Inorganic Salt | None | K$_2$HPO$_4$ | K Citrate | K Acetate | K$_2$CO$_3$ | KBr | KCl |
| INITIAL PROPERTIES | | | | | | | |
| pH | 8.7 | 8.7 | 9.4 | 8.8 | 10.9 | 7.8 | 8.0 |
| SSI | 90.3 | 96.6 | 94.8 | 91.4 | 96.5 | 94.3 | 92.0 |
| LSRV | 41000 | 33300 | 36700 | 40300 | 44300 | 36800 | 34700 |
| API Rheology | | | | | | | |
| PV | 56 | 36 | 45 | 53 | 59 | 47 | 42 |
| YP | 37 | 31 | 31 | 35 | 41 | 32 | 29 |
| 10"/10' Gels | 13/18 | 12/16 | 14/19 | 14/19 | 16/21 | 14/19 | 12/15 |

TABLE B-continued 0.98 bbl of 10.07 Vol. % PEG 8000, 3.75 lbm/bbl Modified Starch I, 1.25 lbm/bbl Xanthan Gum, 20.3 lbm/bbl Sized CaCO$_3$, 1.0 lbm/bbl Fumed Silica, 1.0 lbm/bbl Inorganic Salt

| Fluid | 1 | 2 | 3 | 4 | 5 | 6 | 7 |
|---|---|---|---|---|---|---|---|
| PROPERTIES AFTER 16 HOURS HOT ROLLING AT 150° F. | | | | | | | |
| pH | 7.8 | 8.6 | 8.8 | 7.5 | 10.8 | 7.3 | 7.7 |
| LSRV | 35600 | 25700 | 34400 | 35500 | 36200 | 34500 | 400 |
| API Rheology | | | | | | | |
| PV | 42 | 30 | 48 | 54 | 57 | 58 | 15 |
| YP | 30 | 26 | 31 | 29 | 32 | 34 | 5 |
| 10"/10' Gels | 14/18 | 11/15 | 15/19 | 13/18 | 15/19 | 14/19 | 3/3 |

TABLE C 0.98 bbl of 9.24 Vol. % PEG 8000, 1.25 lbm/bbl Xanthan Gum, 6.0 lbm/bbl Indicated Starch Derivative, 1.0 lbm/bbl MgO, 20 lbm/bbl Sized CaCO$_3$, 1.0 lbm/bbl K$_2$HPO$_4$, 1.0 lbm/bbl Fumed Silica, 0.06 lbm/bbl Defoamer

| Fluid | 1 | 2 | 3 |
|---|---|---|---|
| Starch Derivative | I | II | III |
| INITIAL PROPERTIES | | | |
| pH | 10.0 | 10.0 | 10.1 |
| SSI | 95.8 | 94.5 | 95.4 |
| LSRV | 39700 | 39400 | 41700 |
| API Rheology | | | |
| PV | 37 | 34 | 38 |
| YP | 28 | 29 | 34 |
| 10"/10' Gels | 13/17 | 12/18 | 12/18 |
| PROPERTIES AFTER 16 HOURS HOT ROLLING AT 150° F. | | | |
| pH | 10.4 | 10.2 | 10.6 |
| LSRV | 30100 | 25700 | 30100 |
| API Rheology | | | |
| PV | 37 | 33 | 39 |
| YP | 31 | 30 | 29 |
| 10"/10' Gels | 13/18 | 12/16 | 13/18 |

TABLE D 0.96 bbl of the Indicated PEG Solution, 1.25 lbm/bbl Xanthan Gum, 3.0 lbm/bbl Modified Starch I, 1.0 lbm/bbl Fumed Silica, 1.0 lbm/bbl K$_2$HPO$_4$, 20 lbm/bbl sized Calcium Carbonate, 0.06 gal/bbl Silicone Defoamer, and the Indicated Concentrations of Magnesium Oxide, Dipropylene Glycol (DPG), and PEG 8000

| Fluid | 1 | 2 | 3 | 4 | 5 | 6 | 7 |
|---|---|---|---|---|---|---|---|
| PEG Solution | | | | | | | |
| PEG M. W. | 4600 | 4600 | 4600 | 4600 | 1450 | 1450 | 1450 |
| PEG, % by wt. | 22.2 | 22.2 | 22.2 | 22.2 | 30 | 30 | 30 |
| DPG, % by vol. | 0 | 3 | 0 | 3 | 3 | 0 | 3 |
| MgO, lbm/bbl | 1 | 1 | 1 | 1 | 2 | 1 | 1 |
| PEG 8000, lbm/bbl | 0 | 0 | 25 | 25 | 0 | 25 | 25 |
| Shale Stability Index | 82.2 | 91.8 | 94.0 | 94.4 | 84.3 | 89.6 | 93.8 |

TABLE E 0.49 bbl of 9.24 Vol. % PEG 8000, Indicated Concentrations of Water and/or Glycerin, 1.0 lbm/bbl Xanthan Gum, 4.0 lbm/bbl Pregelatinized Potato Starch, 1.0 lbm/bbl Magnesium Oxide, 1.0 lbm/bbl K$_2$HPO$_4$, 18.0 lbm/bbl Sized Calcium Carbonate, and 1.0 lbm/bbl Fumed Silica

| Fluid | 1 | 2 | 3 |
|---|---|---|---|
| Water, bbl | 0.49 | 0.33 | 0.245 |
| Glycerin, bbl | 0 | 0.16 | 0.245 |
| INITIAL PROPERTIES | | | |
| pH | 9.1 | 9.3 | 9.1 |
| SSI | 93.3 | 95.6 | 97.6 |
| LSRV | 69,400 | 60,700 | 65,300 |
| API Rheology | | | |
| PV | 37 | 51 | 64 |
| YP | 38 | 43 | 46 |
| 10"/10' Gels | 14/18 | 15/20 | 17/22 |
| PROPERTIES AFTER 16 HOURS HOT ROLLING AT 150° F. | | | |
| pH | 10.3 | 9.7 | 9.5 |
| LSRV | 48,800 | 57,200 | 64,300 |
| API Rheology | | | |
| PV | 31 | 57 | 75 |
| YP | 39 | 50 | 55 |
| 10"/10' Gels | 15/19 | 18/23 | 20/24 |

TABLE F

Indicated Concentrations of 9.24 Vol. % PEG 8000 and a Mixture of Dipropylene Glycol and Tripropylene Glycol, 3.75 lbm/bbl Starch Derivative No. I, 1.25 lbm/bbl Xanthan Gum, 1.0 lbm/bbl K$_2$CO$_3$, 1.0 lbm/bbl Fumed Silica and 20.3 lbm/bbl Sized Calcium Carbonate

| Fluid | 1 | 2 | 3 | 4 |
|---|---|---|---|---|
| 9.24 Vol. % PEG 8000, bbl | 0.96 | 0.95 | 0.94 | 0.93 |
| Di-Tri Glycol, bbl | 0.02 | 0.03 | 0.04 | 0.05 |
| INITIAL PROPERTIES | | | | |
| pH | 10.92 | 10.87 | 10.66 | 10.25 |
| SSI | 95.2 | 95.6 | 95.8 | 97.4 |
| LSRV | 31,000 | 30,700 | 30,600 | 32,500 |
| API Rheology | | | | |
| PV | 55 | 54 | 60 | 60 |
| YP | 39 | 41 | 37 | 41 |
| 10"/10' Gels | 14/20 | 14/18 | 14/20 | 14/18 |

TABLE F-continued

Indicated Concentrations of 9.24 Vol. % PEG 8000 and a Mixture of Dipropylene Glycol and Tripropylene Glycol, 3.75 lbm/bbl Starch Derivative No. I, 1.25 lbm/bbl Xanthan Gum, 1.0 lbm/bbl $K_2CO_3$, 1.0 lbm/bbl Fumed Silica and 20.3 lbm/bbl Sized Calcium Carbonate

| Fluid | 1 | 2 | 3 | 4 |
|---|---|---|---|---|
| PROPERTIES AFTER 16 HOURS HOT ROLLING AT 150° F. | | | | |
| pH | 10.65 | 10.69 | 10.58 | 10.87 |
| LSRV | 26,300 | 22,600 | 24,900 | 28,200 |
| API Rheology | | | | |
| PV | 54 | 59 | 59 | 65 |
| YP | 33 | 32 | 36 | 38 |
| 10"/10' Gels | 13/17 | 12/15 | 13/17 | 13/17 |

TABLE G 0.98 bbl of 9.24 Vol. % PEG 8000, 1.25 lbm/bbl Xanthan Gum, 2.0 lbm/bbl MgO, 1.0 lbm/bbl $K_2HPO_4$, 20 lbm/bbl Sized $CaCO_3$, 0.06 gal/bbl Silicone Defoamer, and the Indicated Concentrations of Fumed Silica, Precipitated Silica, Modified Starch No. 1 and Modified Starch No. 2

| Fluid | 1 | 2 | 3 |
|---|---|---|---|
| Fumed Silica, lbm/bbl | 1.5 | 1.5 | 0 |
| Precipitated Silica, lbm/bbl | 0 | 0 | 4.5 |
| Modified Starch No. 1, lbm/bbl | 0 | 3.5 | 3.5 |
| Modified Starch No. 2, lbm/bbl | 0 | 3.5 | 3.5 |
| INITIAL PROPERTIES | | | |
| pH | 8.47 | 9.79 | 10.16 |
| SSI | 88.8 | 97.2 | — |
| LSRV | 36,690 | 53,090 | 41,900 |
| API Rheology | | | |
| PV | 30 | 41 | 45 |
| YP | 26 | 33 | 33 |
| 10"/10' Gels | 11/12 | 13/14 | 12/13 |
| HTHP Filtrate | | | |
| Spurt, cc. | 3.0 | 3.0 | 3.5 |
| 30 Minutes, cc | 16.0 | 18.5 | 22.5 |
| PROPERTIES AFTER 16 HOURS HOT ROLLING AT 150° F. | | | |
| pH | 7.13 | 10.51 | 9.88 |
| LSRV | 25,700 | 26,700 | 46,000 |
| API Rheology | | | |
| PV | 21 | 42 | 47 |
| YP | 28 | 38 | 35 |
| 10"/10' Gels | 10/11 | 12/13 | 14/15 |

What is claimed is:

1. A method of enhancing the thermal stability of an aqueous base well drilling and servicing fluid containing a biopolymer viscosifier and a water soluble polyethylene glycol shale inhibitor having a molecular weight from about 1000 to about 10,000 which comprises incorporating into the fluid an amorphous silica viscosifier in an amount sufficient to increase the thermal stability of the fluid as measured by the low shear rate viscosity of the fluid at 0.06 $sec^{-1}$.

2. The method of claim 1 comprising incorporating into the fluid a water soluble salt at a concentration which is insufficient to decrease the thermal stability of the fluid.

3. The method of claim 2 wherein the water soluble salt is a potassium salt.

4. The method of claim 2 wherein the water soluble salt is selected from the group consisting of dibasic potassium phosphate, potassium citrate, potassium acetate, potassium carbonate, potassium bromide, potassium nitrate, potassium oxalate, potassium formate, sodium bromide, cesium chloride, and mixtures thereof.

5. In an aqueous base well drilling and servicing fluid comprising an aqueous phase, a biopolymer viscosifier, and a water soluble polyethylene glycol shale inhibitor having a molecular weight from about 1,000 to about 10,000, the improvement wherein the fluid contains an amorphous silica viscosifier in an amount sufficient to increase the thermal stability of the fluid as measured by the low shear rate viscosity of the fluid at 0.06 $sec^{-1}$.

6. The fluid of claim 5, which additionally contains a water soluble salt at a concentration which is insufficient to decrease the thermal stability of the fluid.

7. The fluid of claim 6 wherein the water soluble salt is potassium salt.

8. The fluid of claim 6 wherein the water soluble salt is selected from the group consisting of dibasic potassium phosphate, potassium citrate, potassium acetate, potassium carbonate, potassium bromide, potassium nitrate, potassium oxalate, potassium formate, sodium bromide, cesium chloride, and mixtures thereof.

9. A well drilling and servicing fluid comprising an aqueous phase, a xanthan gum biopolymer viscosifier, a starch ether derivative fluid loss control additive, a water soluble polyethylene glycol shale inhibitor, and an amorphous silica viscosifier, wherein the concentration of the amorphous silica viscosifier is sufficient to increase the thermal stability of the fluid as measured by the low shear rate viscosity of the fluid at 0.6 $sec^{-1}$, and wherein the polyethylene glycol has a molecular weight from about 1000 to about 10,000.

10. The fluid of claim 9 wherein the amorphous silica is a fumed silica.

* * * * *